US009964251B2

(12) United States Patent
Zhao

(10) Patent No.: US 9,964,251 B2
(45) Date of Patent: May 8, 2018

(54) LOCKING DEVICE

(71) Applicant: SZ DJI OSMO TECHNOLOGY CO., LTD., Shenzhen (CN)

(72) Inventor: Yan Chong Zhao, Kaiyuan (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 265 days.

(21) Appl. No.: 14/909,056

(22) PCT Filed: Mar. 13, 2014

(86) PCT No.: PCT/CN2014/073413
§ 371 (c)(1),
(2) Date: Jan. 29, 2016

(87) PCT Pub. No.: WO2015/135190
PCT Pub. Date: Sep. 17, 2015

(65) Prior Publication Data
US 2016/0186919 A1 Jun. 30, 2016

(51) Int. Cl.
*F16M 11/04* (2006.01)
*G03B 17/56* (2006.01)
*F16M 13/00* (2006.01)

(52) U.S. Cl.
CPC ......... *F16M 11/048* (2013.01); *F16M 11/041* (2013.01); *F16M 11/045* (2013.01); *F16M 13/00* (2013.01); *G03B 17/561* (2013.01); *F16M 2200/027* (2013.01)

(58) Field of Classification Search
CPC ...... G03B 17/561; F16M 11/02; F16M 11/04; F16M 11/041; F16M 11/045; F16M 11/16; F16M 2200/028; F16M 11/048
See application file for complete search history.

(56) References Cited

U.S. PATENT DOCUMENTS

| 7,588,376 B2 * | 9/2009 | Friedrich | F16M 11/043 |
| | | | 248/183.2 |
| 8,534,934 B1 * | 9/2013 | Carney | F16M 11/02 |
| | | | 248/178.1 |
| 8,596,892 B2 | 12/2013 | Murrow et al. | |
| 8,807,496 B2 * | 8/2014 | Kessler | G03B 17/561 |
| | | | 248/187.1 |

(Continued)

FOREIGN PATENT DOCUMENTS

| CN | 201844174 U | 5/2011 |
| CN | 202033572 U | 11/2011 |

(Continued)

OTHER PUBLICATIONS

An Office Action issued by the State Intellectual Property Office of the People's Republic of China for Chinese application No. 2014800014727. The document is dated Aug. 25, 2015.

(Continued)

*Primary Examiner* — Michael P Ferguson
(74) *Attorney, Agent, or Firm* — Anova Law Group, PLLC

(57) ABSTRACT

The present disclosure provides a locking device. The locking device may include a quick release coupling board, a sliding assembly slidably connected with the sliding assembly, and a locking assembly connected to the sliding assembly and configured to lock the quick release coupling board to the sliding assembly.

7 Claims, 4 Drawing Sheets

(56) References Cited

U.S. PATENT DOCUMENTS

| | | |
|---|---|---|
| 9,039,307 B2 * | 5/2015 | Lecuna Aguerrevere ........ F16M 11/048 396/420 |
| 2010/0243851 A1 | 9/2010 | Murrow |
| 2011/0042535 A1 | 2/2011 | Cheng |

FOREIGN PATENT DOCUMENTS

| | | |
|---|---|---|
| DE | 9108256 U1 | 10/1991 |
| EP | 2322839 A2 | 5/2011 |
| GB | 2401037 B | 3/2004 |
| WO | WO 2007/115225 A2 | 10/2007 |

OTHER PUBLICATIONS

An International Search Report for PCT/CN2014/073413.
English-language extended Search Report from the European Patent Office in counterpart European Application No. EP 14 88 5413.6 dated Jan. 27, 2017.

* cited by examiner

LOCKING DEVICE

CROSS REFERENCE TO RELATED APPLICATIONS

This application is a national stage entry of International Application No. PCT/CN2014/073413 filed on Mar. 13, 2014, the entire contents of which are incorporated by reference herein.

FIELD

The subject matter generally relates to locking devices.

BACKGROUND

When shutterbugs and vocational cameramen shoot photos outdoors, in order to select a better shooting angle and effect, they may assemble a camera or video camera on a quick mounting plate after adjusting an angle of a mounting gimbal, assemble the quick mounting plate mounted with the camera or video camera to a fixing support of the mounting gimbal, and lock the quick mounting plate by adjusting a locking device of the quick mounting plate.

An existing locking device of the quick mounting plate may include a first locking element, a second locking element, and a plurality of springs disposed on the second locking element. The locking device can be bulky and difficult to assemble. Further, the spring may swing when compressed or extended, causing it to become loose when entering or exiting the quick mounting plate and causing an inaccurate performance of the locking device.

SUMMARY OF THE INVENTION

An aspect of the present invention is directed to a compact locking device of high-precision and easy to assemble/disassemble.

Another aspect of the present invention is directed to a locking device including a quick release coupling board, a sliding assembly configured to be slidably connected with the quick release coupling board, and a locking assembly connected to the sliding assembly for locking the quick release coupling board and the sliding assembly.

In some embodiments, the quick release coupling board can comprise a bottom plate and two opposite side walls. The two side walls each define a sliding slot. Each sliding slot comprises a blocking sheet opposite to the bottom plate. The sliding assembly comprises a guiding piece and a seat, a shape and size of the guiding piece corresponding to a shape and size of the sliding slot. The guiding piece comprises a first sliding plate and a second sliding plate connected with the first sliding plate, a step surface is formed on the first sliding plate where the first sliding plate and the second sliding plate are connected, a connecting pole extends from the second sliding plate perpendicularly, first screw threads are defined on outer surface of the connecting pole, the seat comprises a center portion, a through hole is defined in the seat and configured to penetrate through the center portion, the connecting pole penetrates through the through hole of the seat, the locking assembly comprises a first locking element, the first locking element comprises a first main body and a connecting portion perpendicular to the first main body, the connecting portion is a hollow structure with a first screw hole defined therein, the first screw hole and the first screw threads of the connecting pole are coupled, when it is needed to lock the quick release coupling board with the sliding assembly, the first screw hole of the first locking element is screwed with the first screw threads of the connecting pole, when the first locking element is locked firmly, the step surface of the first guiding piece is locked with the blocking sheet.

In some embodiments, the connecting portion and the though hole can be all circled-shaped, and a radius of the connecting portion is smaller than a radius of the through hole.

In some embodiments, two locating blocks can be formed on a top surface of the center portion, the two locating blocks face each other, a sliding opening is defined in two sides of each locating block respecting to the sliding slot, and the seat is connected to the quick release coupling board via the sliding openings.

In some embodiments, the top surface and the two locating block together form a receiving portion for receiving the guiding piece.

In some embodiments, the bottom plate can be rectangular, the side walls each extend perpendicularly from periphery sides of the bottom plate downwards, and each blocking sheet is integrally formed on the corresponding side wall.

In some embodiments, the seat can comprise elastic holding portion each positioned on one side of the center portion, and the elastic holding portions each are configured to clip a rod.

In some embodiments, a channel can be defined in middle of the center portion, the channel penetrates through two opposite sidewalls of the center portion and connects the two elastic holding portions.

In some embodiments, the locking assembly can comprise a second locking element screwed with the first locking element, the second locking element can comprise a second main body and an abutting portion perpendicular to the second main body, a groove is defined in the second main body, a shape and size of the groove are corresponding to those of the first main body for receiving the first main body, the abutting portion is a hollow structure with a second screw hole defined therein, the second screw hole penetrates through the abutting portion and connects with the groove, male screw threads are formed on an outer surface of the connecting portion, the second screw hole and the male screw threads of the connecting portion are coupled, when the rod is sleeved in the elastic clip loose, the sliding assembly can slide along the rod, when the rod is sleeved in the elastic clip firmly, the second screw hole of the second locking element is screwed with the male screw threads of the first locking element, the abutting portion abuts the center portion of the seat, the second locking element is screwed firmly towards the seat, thereby the elastic clip is firmly clipped to the rod.

In some embodiments, the locking device can be mounted on a mounting gimbal, a plurality of locating holes can be defined in the bottom plate for fixing an image device.

Advantages of the present disclosure are such that the quick release coupling board can be slidably connected with the sliding assembly, and the locking device can lock the quick release coupling board to the sliding assembly. Thus, the quick release coupling board can be locked at any predetermined position of the sliding assembly by the locking device, increasing the precision of the quick release coupling board and reducing the device volume for assembly or disassembly.

BRIEF DESCRIPTION OF THE DRAWINGS

Implementations of the present technology will now be described, by way of example only, with reference to the attached figures.

DETAILED DESCRIPTION

FIGS. 1-4 illustrate a locking device 100, which includes a quick release coupling board 10, a sliding assembly 20, and a locking assembly 30. In one embodiment illustrated in FIG. 1, the locking device 100 is mounted on a gimbal. The quick release coupling board 10 is slidably connected to the sliding assembly 20. The locking assembly 30 is connected to the sliding assembly 20 and is configured to lock the quick release coupling board 10 to the sliding assembly 20.

Figure 1:
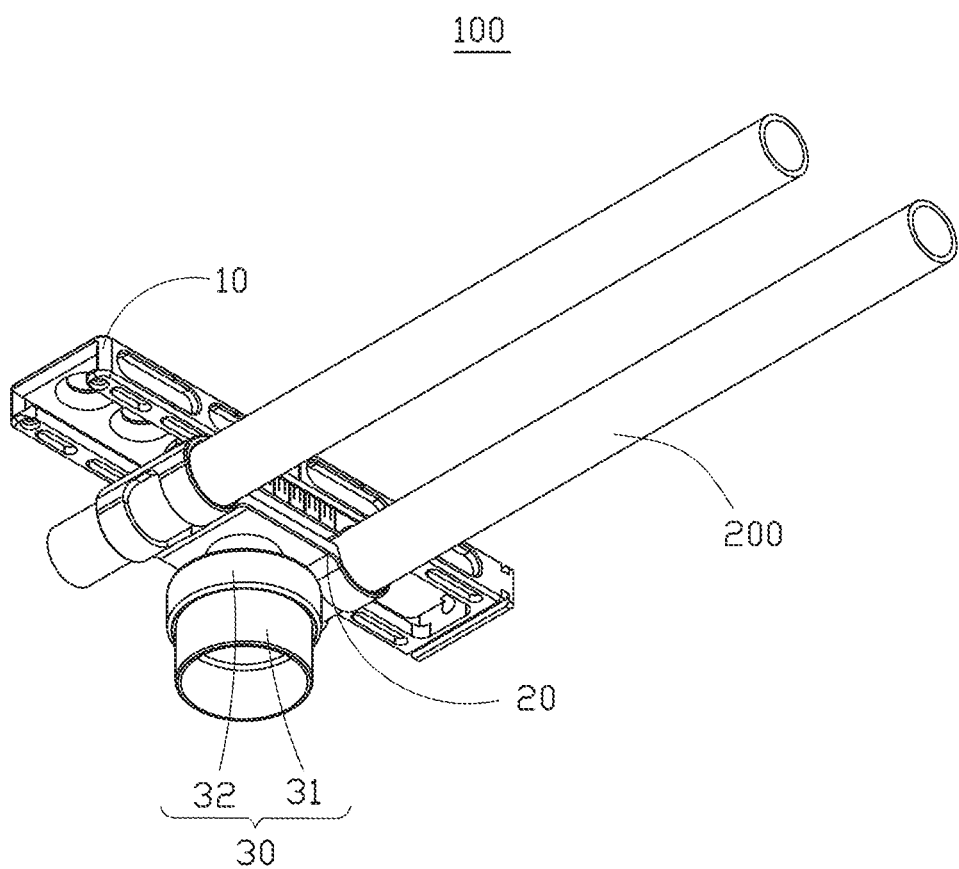
FIG. 1 is an isometric view of a locking device in accordance with an exemplary embodiment of the present disclosure.
Figure 2:
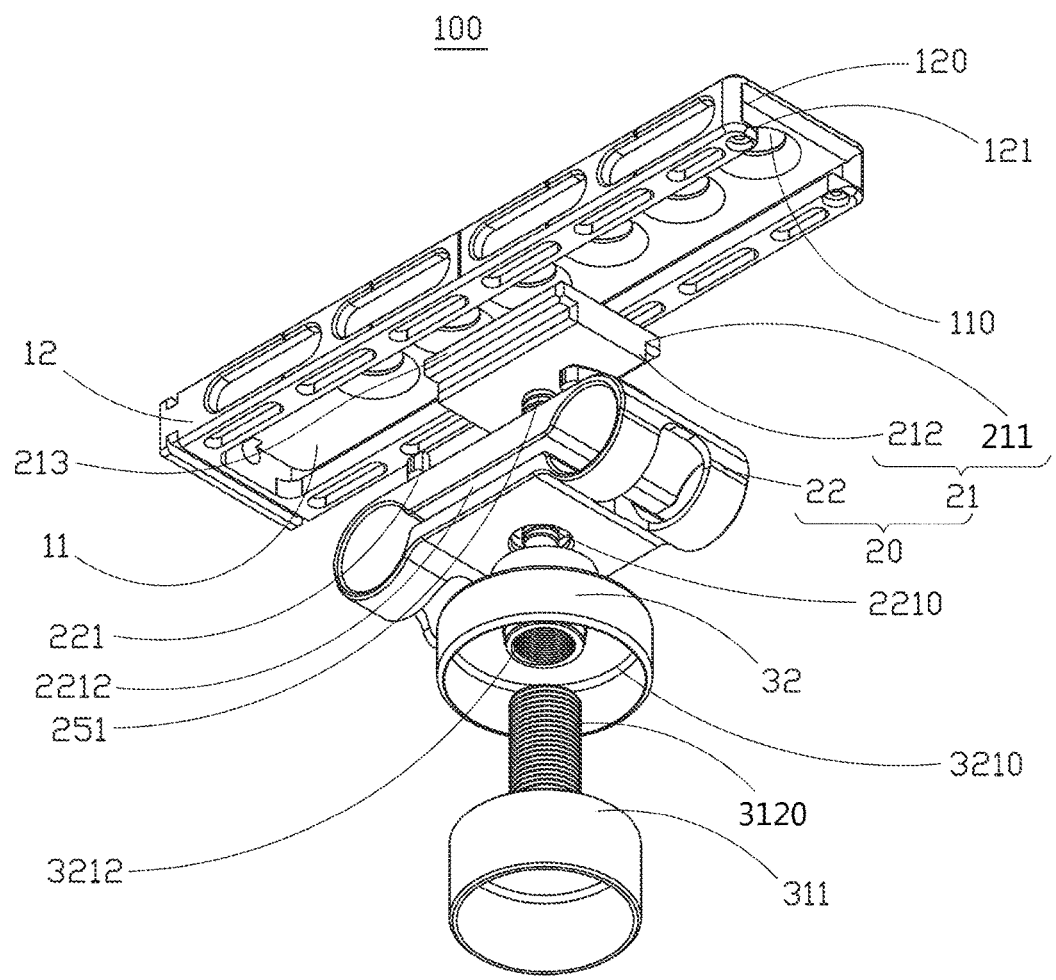
FIG. 2 is an exploded perspective view of the locking device, in accordance with exemplary embodiments of the present disclosure.

As illustrated in FIG. 2, the quick release coupling board 10 includes a bottom plate 11 and two opposite side walls 12. In the illustrated embodiment, the bottom plate 11 can be rectangular. The side walls 12 each extend perpendicularly downwards from a respective one of periphery sides of the bottom plate 11. The two side walls 12 each define a sliding slot 120. Each sliding slot 120 includes a blocking sheet 121. Both of the two blocking sheets are opposite to the bottom plate 11. Each blocking sheet 121 is integrally formed with the corresponding side wall 12. A plurality of locating holes 110 are defined on the bottom plate 11. In one embodiment, the locating holes 110 are configured to fix an imaging device, such as a camera.

The sliding assembly 20 includes a guiding piece 21 and a seat 22.

Figure 3:
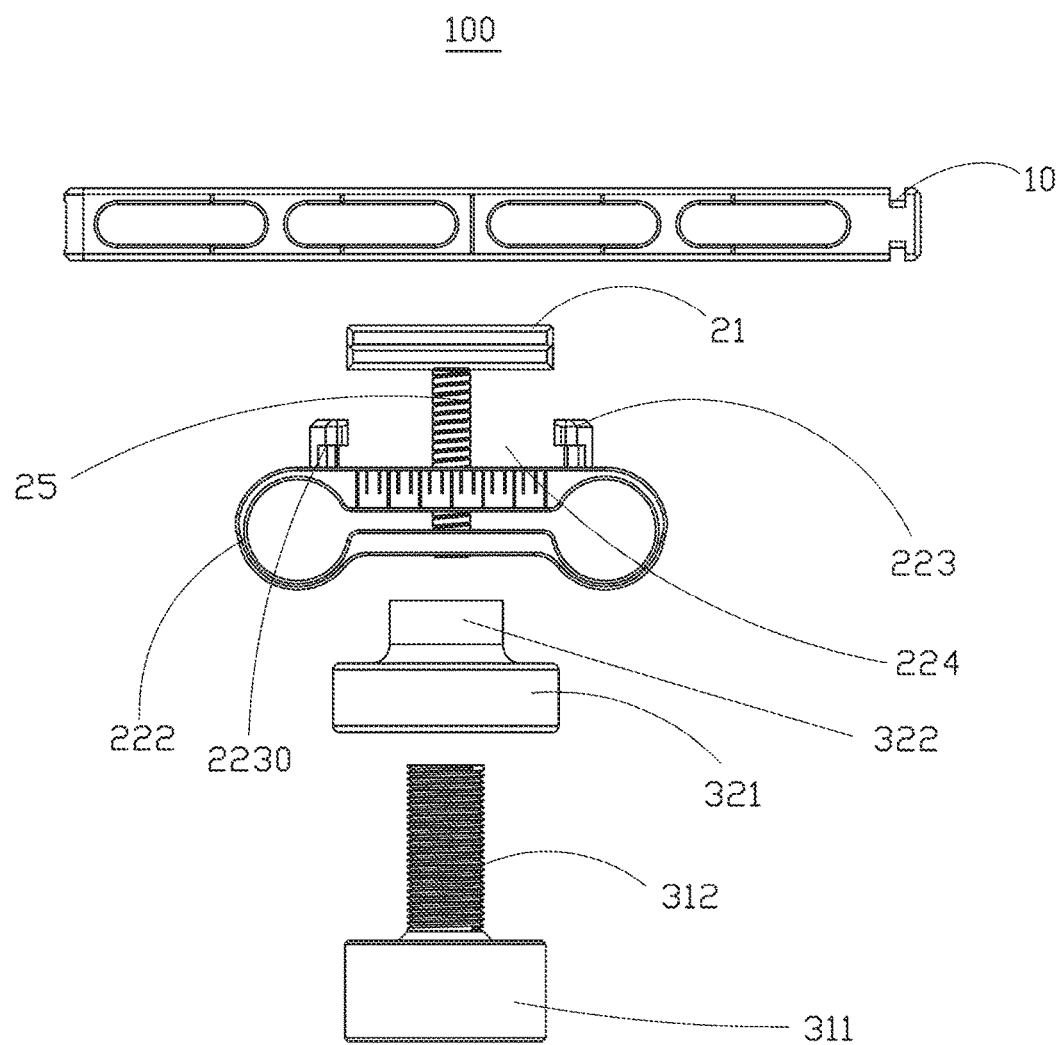
FIG. 3 is a front view of the locking device of FIG. 2, in accordance with exemplary embodiments of the present disclosure.
Figure 4:
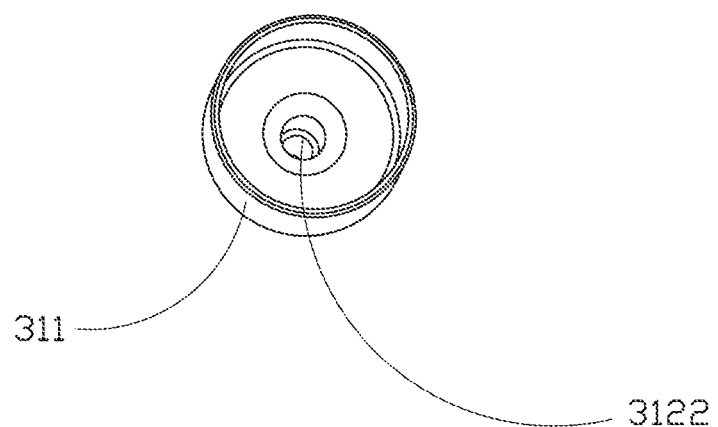
FIG. 4 is a front view of a first locking element in the locking device of FIG. 1, in accordance with exemplary embodiments of the present disclosure.

As illustrated in FIG. 2 and FIG. 3, a shape and size of the guiding piece 21 correspond to those of the sliding slot 120. For example, the guiding piece 21 includes a first sliding plate 211 and a second sliding plate 212 connected to the first sliding plate 211. In one embodiment, a width of the first sliding plate 211 is greater than that of the second sliding plate 212. The first sliding plate 211 defines a step surface 213 formed on where the first sliding plate 211 and the second sliding plate 212 are connected. A connecting pole 25 extends from the second sliding plate 212 perpendicularly. First screw threads 251 are defined on outer surface of the connecting pole 25.

The seat 22 includes a center portion 221 and elastic holding portions 222 positioned on each side of the center portion 221.

Two locating blocks 223 are formed on a top surface of the center portion 221. The top surface 221 is adjacent to the quick release coupling board 10. The two locating blocks 223 can face each other. A sliding opening 2230 is defined in two sides of each locating block 223, with respect to the sliding slot 120. The top surface 221 and the two locating blocks 223 cooperatively form a receiving portion 224 for receiving the guiding piece 21. The seat 22 includes a through hole 2210 through the center portion 221. In one embodiment, the through hole 2210 is circular. In one example, each elastic holding portion 222 is a hollow circle tube and configured to clip a rod 200. A channel 2212 is defined in middle of the center portion 221. The channel 2212 penetrates through two opposite sidewalls of the center portion 221 and forms between the two elastic holding portions 222.

The locking assembly 30 includes a first locking element 31 and a second locking element 32 screwed with the first locking element 31. The first locking element 31 includes a first main body 311 and a connecting portion 312 perpendicular to the first main body 311. The connecting portion 312 is column-shaped. Male screw threads 3120 are formed on outer surface of the connecting portion 312. The connecting portion 312 is a hollow structure with a first screw hole 3122. The first screw hole 3122 and the first screw threads 251 of the connecting pole 25 can be coupled. In one embodiment, the first screw hole 3122 penetrates through the connecting portion 312. In one embodiment, a radius of the connecting portion 312 is smaller than that of the through hole 2210.

The second locking element 32 includes a second main body 321 and an abutting portion 322 perpendicular to the second main body 321. A groove 3210 is defined in the second main body 321. A shape and size of the groove 3210 correspond to those of the first main body 311 for receiving the first main body 311. The abutting portion 322 is a hollow structure with a second screw hole 3212. The second screw hole 3212 penetrates through the abutting portion 322 and communicates with the groove 3210. In the illustrated embodiment, the second screw hole 3212 and the male screw threads 3120 of the connecting portion 312 can be coupled.

When the locking device 100 is assembled, the connecting pole 25 penetrates through the though hole 2210 of the seat 22, and the guiding piece 21 is received in the receiving portion 224. The second screw hole 3212 of the second locking element 32 threadedly engage the male screw threads 3120 of the connecting portion 312 of the first locking element 31, with the abutting portion 322 of the second locking element 32 being away from the first locking element 31. Finally, the seat 22 is connected to the quick release coupling board 10 via the sliding openings 2230 at two sides of each locating block 223. The step surface 213 faces the blocking sheet 121.

When the locking device 100 is used and when coupling of the step surface 213 of the first guiding piece 21 to the blocking sheet 121 is loose, the quick release coupling board 10 can slide in the seat 22 of the sliding assembly 20 via the loose coupling between the first sliding plate 211 and the sliding slot 120. When it is needed to lock the quick release coupling board 10 with the sliding assembly 20, the first screw hole 3122 of the first locking element 31 threadedly engages the first screw threads 251 of the connecting pole 25 to screw the first locking element 31 firmly. The step surface 213 of the first guiding piece 21 is locked with the blocking sheet 121 firmly, so that the quick release coupling board 10 and the sliding assembly 20 are secured in place.

When contact between the rod 200 and the elastic holding portion 222 is loose, the sliding assembly 20 can slide along the rod 20. When the rod 200 is firmly held by the elastic holding portion 222, the second screw hole 3212 of the second locking element 32 threadedly engages the male screw threads 3120 of the first locking element 31, the abutting portion 322 abuts against the center portion 221 of the seat 22, the second locking element 32 is screwed firmly towards the seat 22, therefore the rod 200 is clipped by the elastic clip 222 firmly.

It is to be understood that numerous variations, changes and substitutions will now occur to the sliding assembly and the locking assembly without departing from this disclosure.

For example, when the rod 200 does not need to be firmly held by the locking device 100, there is no need to define the channel 2212 in the seat 22, nor to form the elastic holding portion 222. The second locking element 32 can also be omitted.

The quick release coupling board can slide together with the sliding assembly in the present disclosure provides, and the quick release coupling board and the sliding assembly can be locked via the locking assembly. Thus, the quick release coupling board can be locked at any position of the sliding assembly, realizing accurate locking of the quick release coupling board and decreasing device volume for assembly.

It is to be further understood that even though numerous characteristics and advantages have been set forth in the foregoing description of embodiments, together with details of the structures and functions of the embodiments, the disclosure is illustrative only; and that changes may be made in detail, according in matters of shape, size, and arrangement of parts within the principles of the disclosure to the full extent indicated by the broad general meaning of the terms in which the appended claims are expressed.

The embodiments shown and described above are only examples. Many details are often found in the art such as the other features of an optical waveguide lens. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A locking device, comprising:
   a quick release coupling board comprising a bottom plate and two opposing side walls, the two side walls each including a sliding slot aligned with the sliding slot of the other side wall, each sliding slot comprising a blocking sheet opposite to the bottom plate;
   a sliding assembly slidably connected with the quick release coupling board, the sliding assembly comprising a guiding piece and a seat, wherein:
   the guiding piece comprises a first sliding plate and a second sliding plate stacked on the first sliding plate to form a step, a shape and size of the first sliding plate corresponding to a shape and size of the sliding slots, a connecting pole extending from the second sliding plate perpendicularly between the side walls, the connecting pole having first screw threads on an outer surface of the connecting pole; and
   the seat comprises a center portion, opposing elastic holding portions each positioned on one side of the center portion, and a through hole in the seat and passing through the center portion, the elastic holding portions each configured to clip around a rod, the connecting pole penetrating through the through hole of the seat; and
   a locking assembly connected to the sliding assembly and configured to lock the quick release coupling board to the sliding assembly, the locking assembly comprising a first locking element and a second locking element threadedly coupled with the first locking element, wherein:
   the first locking element comprises a cylindrical first main body and a cylindrical connecting portion axially extending from the first main body, the connecting portion being a hollow structure with a first screw hole and having male screw threads on an outer cylindrical surface of the connecting portion; and
   the second locking element comprises a cylindrical second main body and a cylindrical abutting portion axially extending from the second main body, the second main body comprising an annular recess with a shape and size corresponding to the shape and size of the first main body for receiving the first main body, the abutting portion being a hollow structure with a second screw hole, the second screw hole penetrating through the abutting portion and communicating with the annular recess, the connecting portion penetrating through the second screw hole with the male screw threads threadedly coupled therewith, wherein:
   the first screw threads and first screw hole of the connecting portion are threadedly coupled to lock the quick release coupling board to the sliding assembly, by pressing a step surface of the guiding piece against an internal surface of the blocking sheets of the quick release coupling board and by pressing the abutting portion against the center portion of the seat; and
   the second screw hole and the male screw threads of the connecting portion are threadedly coupled to tighten the elastic holding portions of the seat, by pressing the abutting portion of the second locking element against the center portion of the seat.

2. The locking device of claim 1, wherein:
   the connecting portion and the though hole are circular, and
   a radius of the connecting portion is smaller than a radius of the through hole.

3. The locking device of claim 1, wherein:
   two locating blocks are formed on a top surface of the center portion of the seat and face each other,
   a sliding opening is in two sides of each locating block corresponding to the sliding slots, and
   the seat is connected to the quick release coupling board via the sliding openings.

4. The locking device of claim 3, wherein the top surface and the two locating blocks together form a receiving portion for receiving the guiding piece.

5. The locking device of claim 1, wherein:
   the bottom plate of the coupling board is rectangular, the side walls each extend perpendicularly from a respective periphery side of the bottom plate, and
   each blocking sheet is integrally formed with the corresponding side wall.

6. The locking device of claim 1, wherein a channel forms at a center of the center portion, the channel penetrating through two opposite sidewalls of the center portion and connecting the two elastic holding portions.

7. The locking device of claim 1, wherein:
   the locking device mounts on a mounting gimbal, and
   a plurality of locating holes are defined in the bottom plate of the coupling board to hold an imaging device.

* * * * *